W. E. WOODARD.
LOCOMOTIVE DRIVING BOX.
APPLICATION FILED FEB. 17, 1917.
1,265,856.
Patented May 14, 1918.
2 SHEETS—SHEET 1.
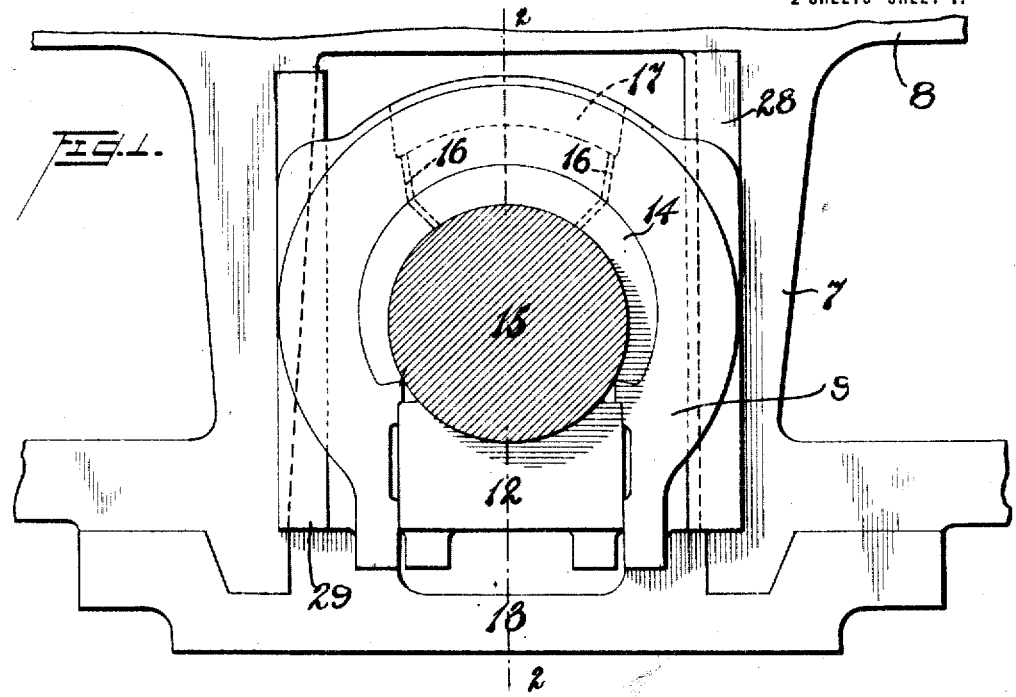
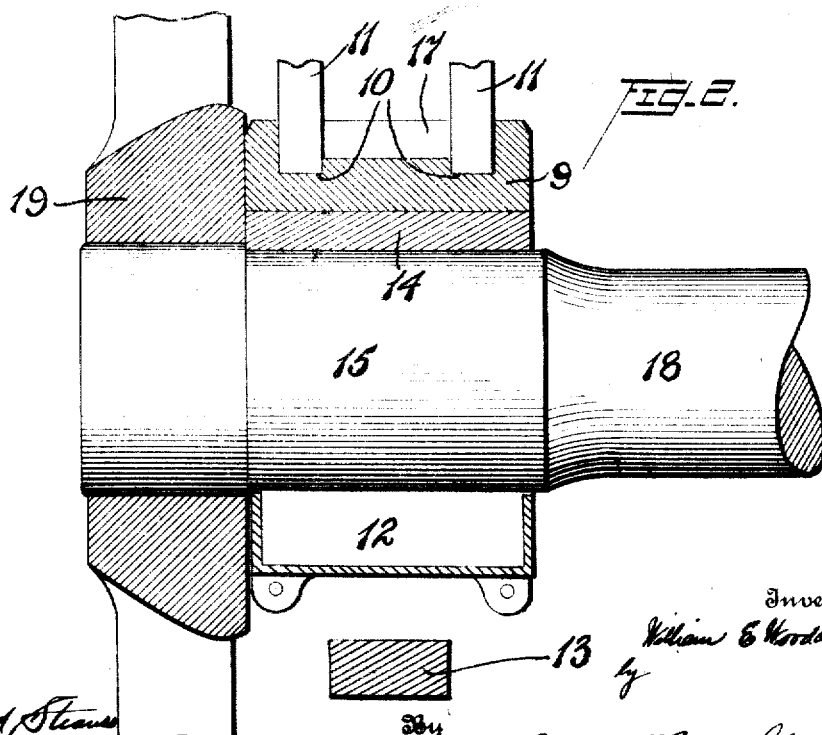

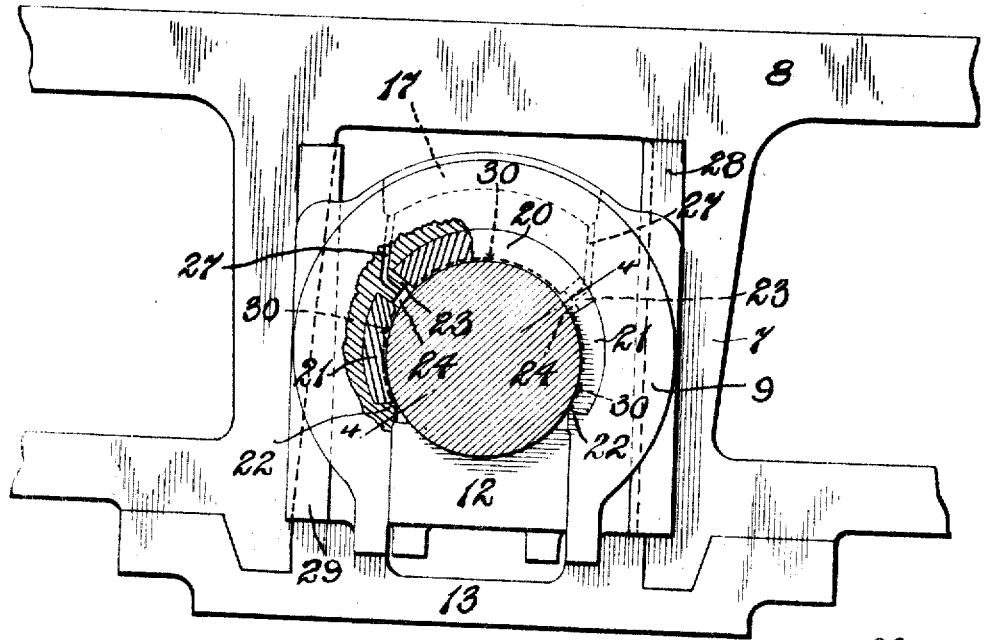
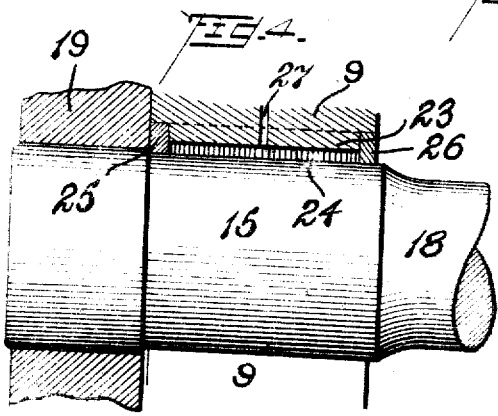
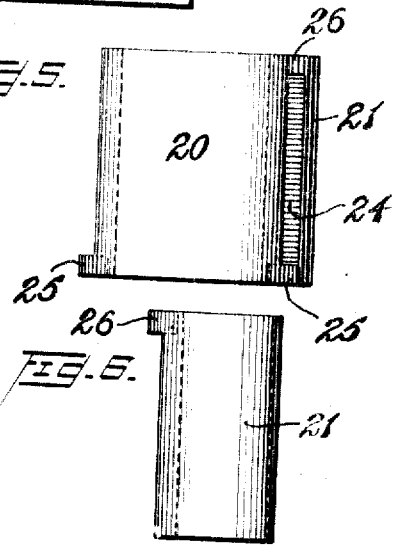

UNITED STATES PATENT OFFICE.

WILLIAM E. WOODARD, OF SCHENECTADY, NEW YORK.

LOCOMOTIVE DRIVING-BOX.

1,265,856.

Specification of Letters Patent.

Patented May 14, 1918.

Application filed February 17, 1917. Serial No. 149,164.

*To all whom it may concern:*

Be it known that I, WILLIAM E. WOODARD, of Schenectady, in the county of Schenectady and State of New York, have invented certain new and useful Improvements in Locomotive Driving-Boxes, of which the following is a specification.

This invention relates to driving boxes for locomotives, and it has for one of its primary objects the provision of an improved driving box having an extended driving box bearing adapted to withstand the heavy horizontal thrusts transmitted to the driving box by the thrusts from the locomotive crank pin and connecting rod on the driving journal.

My invention also contemplates the provision of an improved driving box having a bearing of the character described, which is composed of a plurality of bearing members in which, in addition to other advantages herein noted, the bearing parts which wear more rapidly can be replaced without necessarily renewing the remaining bearing parts.

An additional object resides in the provision of a driving box having such a multi-part bearing, the parts of which are so arranged as to provide a novel and improved means for lubricating the bearing and the journal.

The foregoing, together with such other objects as may hereinafter appear, or are incident to my invention, I obtain by means of a construction, the preferred embodiments of which I have shown in the accompanying drawings, wherein—

Figure 1 is a section through a driving wheel axle showing the engine frame pedestal, driving box and driving box bearing in side elevation; Fig. 2 is a section on the line 2—2 of Fig. 1; Fig. 3 is a side elevation and partial section, similar to Fig. 1, but illustrating a modification of the driving box and bearing; Fig. 4 is a section taken on the line 4—4 of Fig. 3; and Figs. 5 and 6 are detailed views of the parts constituting the multipart bearing shown in Fig. 3.

In the ordinary designs of driving boxes, whether of the standard length or of the extended or long main box type, the driving box bearing encircles the driving journal of a driving wheel axle for one-half of its circumference, or less. Such driving boxes are applied to the driving journal by dropping the driving box with its contained bearing directly onto the journal, which of course necessarily limits the contact between the driving box bearing and the journal to one-half the circumference of the driving journal or less. The difficulty encountered with such a construction has been that the bearing brass wears very rapidly at its lower edges, such lower edges being approximately on the horizontal center line of the journal, or slightly thereabove. Such a driving brass does not provide an adequate bearing to receive the heavy horizonal thrusts which are transmitted to the driving box from the driving journal, which receives these thrusts from the locomotive crank pin and connecting rod, the result being that the bearing brass wears very rapidly or "pounds out" on the horizontal center line, and as soon as a bearing begins to wear, the journal begins to pound backward and forward, rapidly increasing the amount of play along the horizontal center line and requiring the reboring of the bearing brass. I overcome the difficulties noted by providing a driving box having a greatly extended bearing brass which provides an adequate bearing surface to receive the horizontal thrusts, as a result of which the life of the bearing brass is greatly increased, and the cost of maintenance correspondingly decreased.

Referring now to Figs. 1 and 2, it will be seen that I have shown therein the usual pedestal 7 of a locomotive side frame 8, there being mounted in the pedestal a flanged driving box 9 having the usual beds 10 adapted to receive the spring stirrup 11. In the bottom or open end of the driving box is the usual driving box cellar 12, and the pedestal is provided with the customary pedestal brace 13, the specific means for attaching the driving box cellar and the pedestal brace not being shown. The reference numeral 14 denotes my improved form of driving box bearing or bearing brass, and it will be seen that such bearing brass extends a substantial distance below the horizontal center line of the driving journal 15 of the axle and embraces the journal, roughly speaking, about two-thirds of its circumference.

The bearing brass is pressed into the driving box 9 in the usual manner and it is lubricated by grease from the driving box cellar being carried up and around the journal.

Although not customary, lubricant may be supplied at points above the driving box cellar, as by means of the oil grooves 16 leading from the waste box 17 in the top of the driving box.

The parts are positioned by first assembling the driving box and its bearing and then the box and its contained bearing are passed over the driving axle 18 which is reduced in diameter intermediate the driving journal 15, after which the driving box and bearing are slipped endwise onto the driving journal. The driving box cellar is next put in place, after which the side frames are dropped in place over the driving box and the pedestal brace 13 applied. It will be seen that the driving box bearing or brass may be carried around the driving journal to a point such that the opening in the driving box and in the bearing will just pass over the axle at the reduced middle section, the degree to which the driving bearing may be carried around the journal being dependent upon the relative reduction of the axle 18 with respect to the journal 15, or, vice versa, with the relative increase of the journal 15 with respect to the axle 18. I have not shown any renewable wear or lateral motion plate between the face of the driving box and the hub 19 of the driving wheel, but it is of course to be understood that my improvements may be applied to driving boxes having such plates.

From the foregoing it will be seen that I have provided a driving box having an extended bearing, embracing the driving journal throughout more than one-half of its circumference, thus providing extended bearing surfaces adapted to withstand the heavy horizontal thrusts on the driving box, the result of which is that the lower portions of such improved bearing brass do not wear out so rapidly. The life of the bearing is therefore greatly extended and the cost of maintenance incident to the frequent withdrawal of the locomotive, for replacement of the driving bearings, is correspondingly reduced.

In the modification shown in Figs. 3 to 6 inclusive, I have shown a construction of driving box and driving box bearing which embodies the same fundamental idea of carrying the driving bearing around the driving journal beyond the horizontal center line thereof, but in this instance the driving bearing, instead of being a one-piece member, is composed of a plurality of pieces, namely, a main or central bearing piece 20 adapted to be mounted in the upper portion of the driving box, and two wing pieces or end members 21, adapted to receive the major portion of the horizontal thrusts.

The driving box casting in his construction, in addition to the shoulders 22 forming the bottom ends of the driving brass opening, has two shoulders 23 which project inwardly into the opening o space adapted to receive the driving brass. These shoulders are spaced above the horizontal center line of the journal about the same distance as the shoulders 22 are spaced below the horizontal center line, and in length they are slightly less than the thickness of the driving brass parts. The central driving brass member 20 is pressed into position between the shoulders 23, and the end driving brass members 21 are pressed into position between the shoulders 23 and the shoulders 22. The shoulders 23, in addition to constituting a means against which the driving brass parts bear, serve to space apart said members so as to provide lubricating channels 24 which extend longitudinally of the driving journal and terminate just short of the faces of the driving box. The ends of these channels are closed in the following manner.

The central bearing brass member 20, at each side on one end, is provided with a laterally projecting lug 25, and the end driving brass members 21, of which there is a right and a left hand member, on the opposite end and on the inner side have an oppositely extending lug 26. In Fig. 5, I have shown the central member 20 and the right hand member 21 of the driving brass in assembled position, and from inspection of this figure it will be seen that the lugs 25 and 26 close the ends of the channels 24. Oil or other lubricant is introduced into the channels 24 by means of the oil grooves 27 which extend from the waste box 17 through the driving box, opening in the face of the lugs or shoulders 23.

The parts are assembled as follows assuming that the driving brass member 21 has been pressed into place between the shoulders 23 with the lug end outward, that is, toward the outer face of the driving box, and that then the members 21 of the driving brass, with the lug end inward, have been pressed into position between the shoulders 22 and 23. The driving box and its contained driving brass parts are passed over the reduced portion of the axle and then are slipped into position endwise onto the journal 15, after which the driving box cellar 12 is secured in position, the frame dropped over the driving box, and the pedestal brace 13 attached.

It will be seen from the foregoing that this modification also has the same general advantages incident to the first construction described, in that it provides an extended bearing for the driving journal which makes ample provision for the heavy horizontal thrusts. In addition, it also provides a convenient and improved means, supplementing the usual driving box cellar, for lubricating the driving journal. The construction also has a marked advantage because it is of such a character that the end bearing members 21, which wear more rapidly than the central member 20, can be renewed without necessarily renewing the central member.

It will of course be understood that the driving box cellar 12 is of standard construction, adapted to receive grease in cake or other form, the grease being held against the journal by the usual spring located in the bottom of the cellar. It will also be understood that the driving box is positioned in the pedestal by the usual shoe 28 and wedge 29.

In the event that sole reliance for lubrication is placed upon the grease in the driving box cellar, such grease will be carried around by the rotating journal, but in such cases it is preferable to provide grooves communicating with the main lubricating grooves 24, so that a greater quantity of grease from the cellar may be carried into the grooves 24. In Fig. 3 I have indicated one way of accomplishing this, namely, by providing small grooves 30 in the bearing members 20 and 21.

I claim:

1. The combination with a locomotive driving axle having a journal and a portion of smaller diameter than the journal, of an integral locomotive driving box having a gap greater than the diameter of the reduced portion and smaller than the diameter of the journal, and a bearing in said box adapted to engage the journal a substantial distance above and below the horizontal center line thereof, the gap in the bearing being also less than the diameter of the journal and greater than the diameter of the reduced portion, whereby the box and the contained bearing may be passed over the reduced portion of the axle and slipped on the journal.

2. The combination with a locomotive driving axle having a journal and a portion of smaller diameter than the journal, of an integral locomotive driving box, the gap in which is less than the diameter of the journal and greater than the diameter of the reduced portion, said box being provided with a bearing composed of a plurality of parts adapted to engage substantially more than one-half of the circumference of the journal, said bearing parts being arranged to provide a gap less than the diameter of the journal and greater than the diameter of the reduced portion, whereby the box and contained bearing may be passed over the reduced portion of the axle and slipped over the journal.

3. The combination with a locomotive driving axle of a locomotive driving box having a driving bearing composed of a plurality of parts, said parts being spaced to provide a space for lubricant, and means for closing the ends of said space.

4. The combination with a locomotive driving axle having a journal and a portion of smaller diameter than the journal, of an integral driving box the gap in which is less than the diameter of the journal and greater than the diameter of the reduced portion, and a bearing rigidly mounted in said box and adapted to engage substantially more than one-half of the journal of the axle, the gap in said bearing being less than the diameter of the journal and greater than the diameter of the reduced portion, whereby the box and its contained bearing may be passed over the reduced portion and slipped over the journal.

5. The combination with a locomotive driving axle having a journal and a reduced portion of smaller diameter than the journal, of an integral driving box the gap in which is less than the diameter of the journal and greater than the diameter of the reduced portion, and a bearing adapted to embrace substantially more than one-half of the circumference of the journal, said bearing comprising a plurality of parts each rigidly mounted in said box and arranged to provide a gap less than the diameter of the journal and greater than the diameter of the reduced portion, whereby the box and its contained bearing may be passed over the reduced portion and slipped over the journal.

6. A locomotive driving box having an opening to receive a driving box bearing, a plurality of spaced lugs on the box and extending into said opening, and parts composing the bearing fitted into said opening between the lugs.

7. The combination with a locomotive driving axle of a locomotive driving box having a driving bearing composed of a plurality of parts, said parts being spaced to provide a space for lubricant, and having at their ends projections closing the ends of said space.

8. An integral locomotive driving box having a driving box bearing composed of three parts, namely two wing members adapted to engage the driving axle on opposite sides, above and below the horizontal center line thereof, and an intermediate member adapted to engage the top portion of the axle.

In testimony whereof I have hereunto signed my name.

WILLIAM E. WOODARD.